May 22, 1956 J. H. BAKER 2,746,244
REACTION POWER PLANT VARIABLE DISCHARGE
AREA NOZZLE CONTROL SYSTEM
Filed March 5, 1953
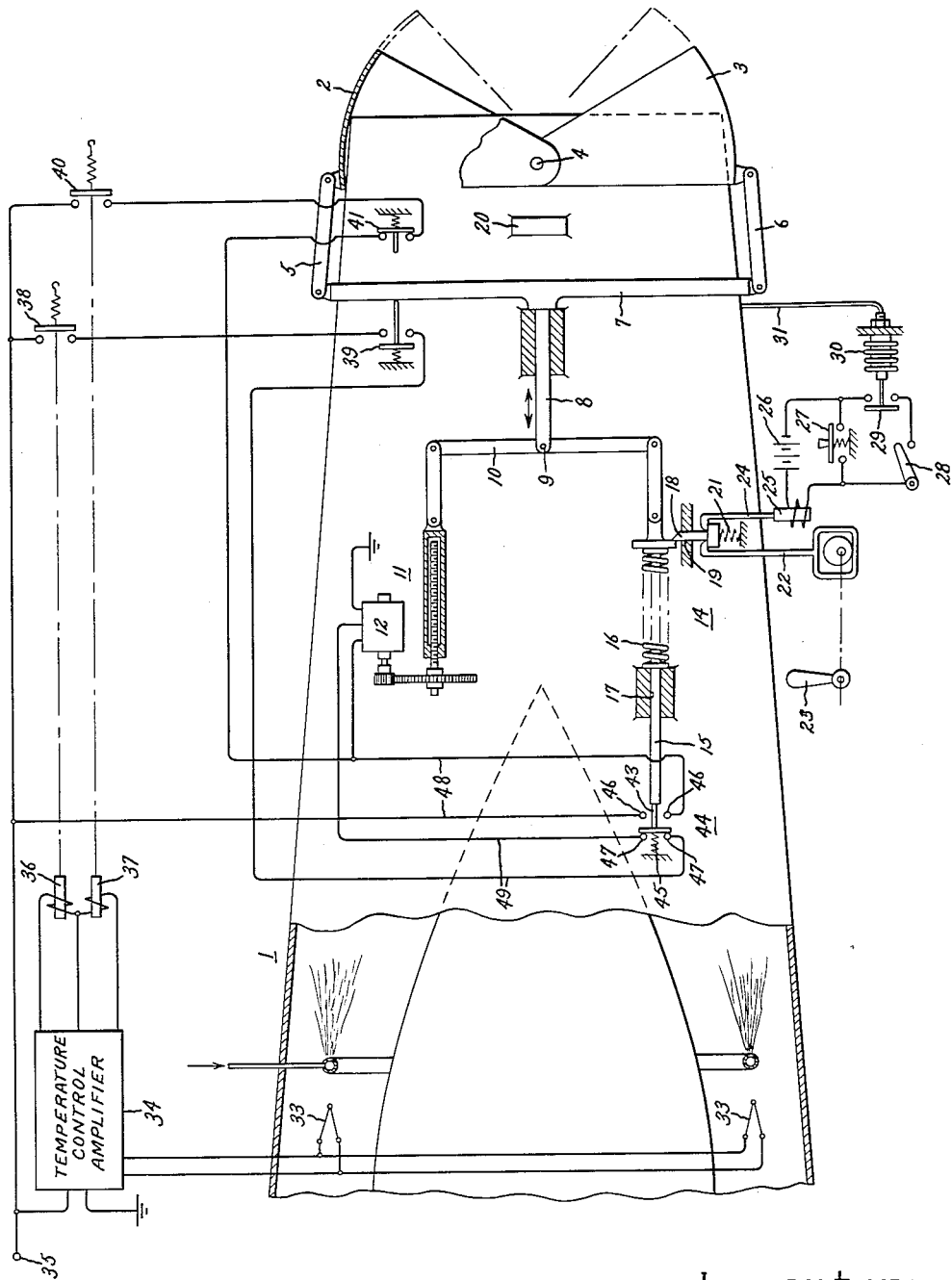
Inventor:
John H. Baker,
by Richard E. Hosley
His Attorney.

United States Patent Office 2,746,244
Patented May 22, 1956

2,746,244

REACTION POWER PLANT VARIABLE DISCHARGE AREA NOZZLE CONTROL SYSTEM

John H. Baker, Washington, D. C., assignor to General Electric Company, a corporation of New York Application March 5, 1953, Serial No. 340,497

11 Claims. (Cl. 60—35.6)

This invention relates to variable discharge area nozzle control systems for thermal reaction power plants such as aircraft jet engines, and more particularly to systems providing for very rapid nozzle closure to provide a rapid increase or re-establishment of engine thrust output power whenever such rapid increase is required.

In the operation of reaction power plants having variable discharge areas, particularly in the operation of gas turbine power plants commonly known as jet engines which are employed in the propulsion of aircraft, it is frequently the practice of the pilot to temporarily reduce the engine power, such as when bringing the aircraft in for a landing, by opening the nozzle to increase the discharge area. This decreases the velocity of the exhaust gases and thereby decreases the power output without decreasing turbine speed so that if conditions are not right for landing the aircraft, increased power may be reacquired quickly by closing the exhaust nozzle without waiting for acceleration of the turbine. It is extremely important on such an occasion that the re-establishment of thrust obtainable by nozzle closure should occur in the shortest possible time in order to avoid disastrous difficulties for the aircraft. However, the operation of the usual nozzle adjusting actuator is likely to be relatively slow for the following reasons: Nozzle adjustment under other conditions need not be so fast. The size and the weight of the nozzle actuating motors for aircraft use should obviously be kept to a minimum. Also automatically actuated jet nozle systems may be built with a limited speed of response in order to obtain greater system stability.

Accordingly, it is one important object of the present invention to provide an improved rapid operating mechanism for closing the variable area discharge nozzle, when required, at an extremely rapid rate, exceeding the speed of the nozzle actuator normally provided.

A further object of the present invention is to provide a fast acting, nozzle closing mechanism which can be re-set by the regular nozzle actuator.

Aircraft gas turbine power plants having variable discharge area nozzles are also frequently equipped with apparatus for augmentation of the thrust normally available from the fuel burned in the regular combustion chambers. This augmentation apparatus may operate in a number of known ways such as by the introduction of additional fuel (sometimes referred to as "reheat fuel") in the tail pipe for combustion there by "after-burners", or by similar injection of a water-alcohol mixture for vaporization. The thrust augmentation apparatus is employed when maximum power is required and one of the most important occasions for this is during aircraft take-off. Whenever the thrust augmentation apparatus is employed, the greater expansion of the exhaust gases and the greater volume of gases available require that the variable discharge nozzle area be completely open, or nearly so. If for any reason the thrust augmentation apparatus should cease functioning during take-off, the engine power and thrust are immediately reduced to the low value obtainable with the discharge nozzle open under normal unaugmented engine operating conditions. It is imperative under such circumstances that the variable area discharge nozzle be closed as quickly as possible in order to establish a thrust level as high as is attainable with "dry" or unaugmented engine operation.

Accordingly, it is a further important object of the present invention to provide a fast acting nozzle closing system which is automatically operable upon failure of the engine thrust augmentation system.

In carrying out the above objects of this invention, a system may be employed in which a quick-release nozzle closing device and a conventional nozzle actuating motor are inter-connected through a common lever to which a nozzle actuating linkage is connected at an intermediate point. The quick release closing device may be normally held by a latch which may release it for closing actuation of the nozzle, through the lever connection, to a maximum closed position determined by a mechanical stop. A device responsive to tail pipe pressure, indicating the presence or absence of thrust augmentation may be arranged to automatically trip the latch upon loss of augmentation. Apparatus may also be provided for automatically energizing the actuator motor in the closing direction upon release of the quick-closing mechanism to cause the actuator motor to re-set the quick-closing mechanism by forces transmitted through the lever.

Further objects and advantages of this invention will be apparent from the following specification and the accompanying drawing which is a schematic diagram of a preferred embodiment of the system of this invention.

Referring more particularly to the drawing, there is shown a tail section of an aircraft gas turbine reaction power plant designated as a whole as 1, having a variable area discharge nozzle of the so-called "clam shell" type including two nozzle adjusting members or clam shells 2 and 3 which are pivotally mounted to the tail pipe at 4. These clam shells 2 and 3 may be respectively adjusted by reciprocable operating members 5 and 6, through pivotal connections at the outer edges thereof. The operating members 5 and 6 are in turn pivotally connected for movement by a wishbone-shaped reciprocable actuating member 7 which straddles the tail pipe. Member 7 includes a central arm 8 which may be characterized below as a reciprocable nozzle adjusting member, and this arm is pivotally connected at 9 to a lever 10. Pivotally connected to the upper end of lever 10 there is a nozzle actuator 11 which may include a direct current reversible motor 12 as a power source. At the bottom of lever 10 there is pivotally connected a quick-closing device 14 including a plunger member 15 and a compression spring 16. The plunger 15 is supported in a suitable guide slot 17 and normally held in the position shown, with spring 16 compressed, by a latch member 18 reciprocally mounted in a suitable guide slot 19. The lever 10 may be referred to below as a differential device as it can transmit a motion corresponding to a difference in the motions of the upper and lower lever ends to the arm 8. In this aspect it is analogous to a set of differential gears.

Under most conditions of operation, where very rapid closure of the nozzle is not required, the latch 18 continues to hold the plunger 15 of the quick-closing device 14 in the position shown. The pivotal connection of quick-closing device 14 with lever 10 therefore acts as a fulcrum in nozzle adjusting movements of the lever 10 provided by movement of actuator 11. If very rapid closure of the nozzle is required, however, the latch member 18 is moved downwardly, releasing the plunger 15 of quick-closing device 14 for movement to the right in the diagram by the force of spring 16. This motion of plunger 15 and lever 10 causes arm 8 and wishbone member 7 to move to the extreme righthand position which may be determined by a stop indicated schematically at 20. At this point, the nozzle is fully closed to give the desired increase in thrust. If the motor 12 of actuating device 11 is then energized for movement of the upper end of lever 10 to the right in the closing direction, the pivot 9 of lever 10 acts as a fulcrum since the spring 16 of quick-closing device 14 is also pushing the lower end of lever 10 to the right through plunger 15 and member 7 is against stop 20. Under this condition, continued movement of the upper end of lever 10 to the right by movement of actuator device 11 causes movement of the lower end of lever 10 to the left. This movement can be continued until plunger 15 is restored to the original position as shown, and reset behind the latch member 18.

The latch member 18 may be "tripped" by movement downwardly against the force of a spring 21 by means of an operating rod 22 and a mechanical operating handle 23. Operation may alternatively be obtained by means of an operating rod 24 connected to an operating solenoid 25 which may be energized from a suitable current source indicated as battery 26 by closure of a manual switch 27. Automatic operation may be obtained by a circuit which parallels the manual switch 27 including a circuit selector switch 28 and a pressure operated switch 29 which is connected for operation by a pressure responsive device such as a bellows 30. Bellows 30 is connected by means of a pressure line 31 with the engine tail pipe 1. The automatic operation of the quick-closing system provided by pressure responsive device 30 is particularly useful where a form of thrust augmentation is employed with the power plant under critical conditions of operation such as on take-off of the aircraft. If failure of the thrust augmentation system occurs due to consumption of the entire supply of augmentation fluid or for any other reason, the tail pipe pressure suddenly decreases and this decrease is detected by the contraction of pressure responsive device 30, closing contacts 29 and completing an energization circuit for latch tripping solenoid 25 through the switch 28 from battery 26. Although the pressure responsive device 30 is shown as responsive to the level of pressure difference between the tail pipe and the atmosphere, it will be appreciated that this device could obviously be modified in a well-known manner in order to provide for operation in response to a sudden pressure drop of a given magnitude without reference to pressure levels, or with a modified characteristic of response with relation to atmosphere pressure.

Under conditions of normal operation, where fast nozzle closure is not required, the nozzle area may be automatically varied in order to control engine temperature. For this purpose, one or more thermocouples 33 may be arranged within the tail pipe 1 and connected to supply a temperature signal to a temperature control amplifier 34 which may be energized from a suitable source of power connected at terminal 35. The temperature control amplifier 34 may be of any suitable known construction such, for instance, as the temperature control amplifier disclosed in my co-pending patent application Ser. No. 102,387, filed June 30, 1949, now Patent No. 2,699,646, issued January 18, 1955, for a "Gas Turbine Power Plant Having Variable Exhaust Area and Control System Therefor," and assigned to the same assignee as the present application. In such a temperature control amplifier, the temperature indicating voltages of the thermocouples are compared with a standard reference temperature voltage source and an error voltage results in an electrical error signal which is amplified and may alternatively energize opening and closing relays such as relays 36 and 37 which are shown connected to the output of amplifier 34. Nozzle opening relay 36 includes contacts 38 which complete an energizing circuit from power terminal 35 through an "open" limit switch 39 to the actuator motor 12. This circuit also includes contacts 47 of a switch 44 to be described more completely below. Nozzle closing relay 37 includes contacts 40 which complete a closing circuit from power terminal 35 through a closed limit switch 41 to the actuator motor 12. The limit switches 39 and 41 are shown as cooperating with the wishbone actuating member 7 to respectively prevent further energization of motor 12 in the opening direction when limit switch 39 is opened, or in the closing direction when limit switch 41 is opened. In order to obtain temperature control of the engine by nozzle adjustments, it is assumed that the main fuel system of the engine (not shown) is controlled in accordance with the speed of the engine turbine. If the nozzle is in a closed position, the reduced volume of discharge increases the static pressure within the engine tail pipe, decreasing the pressure drop across the turbine wheel and causing the main fuel speed responsive system to increase the main fuel flow in an attempt to increase speed, thus increasing engine temperature. Conversely, an increase in nozzle area causes an increase in gas flow, decreasing tail pipe static pressure, increasing the turbine speed, and causing a decrease in main fuel and a resulting decrease in engine temperature.

In contact with the left end of plunger 15 of the quick-closing device 14 there is an operating member 43 of a switch 44. Plunger 15 maintains member 43 in a position disposed to the left in the diagram against the force of a spring 45, as long as plunger 15 is held by latch 18 in the un-released position shown. In this position a set of switch contacts 46 are maintained in an open position and a second set of contacts 47 in a closed position. Upon actuation of the quick-close device 14, however, the plunger 15, in moving to the right, releases the operating member 43 to permit closing of contacts 46 and opening of contacts 47. Contacts 46 thereby provide an electrical connection through conductors 48 which completes the nozzle closing circuit of actuator motor 12, paralleling the closing relay contacts 40 and the close limit switch 41 to provide for immediate and continuous closing operation of the actuator device 11 regardless of the operation of the automatic temperature control amplifier 34 or the closing limit switch 41. Contacts 47, which are connected through lines 49 in series in the nozzle opening circuit, are opened and thereby prevent nozzle opening energization of motor 12. The closing actuation of device 11 thus causes resetting of the quick-close device 14 as described above. When the resetting operation is complete, the quick-closing device plunger 15 again pushes member 43 to the left, opening contacts 46 and closing contacts 47, thus discontinuing further closing operation of motor 12 (since closed limit switch 41 will be open) and re-establishing automatic temperature control of the engine.

Although the energy storage for quick release device 14 has been disclosed as provided by a spring 16, it should be understood that other energy storage devices may be used, for example, such as hydraulic accumulators in which the energy is stored in a compressed gas.

The following claims are intended to define the valid scope of this invention over the prior art and to cover all changes and modifications falling within the true spirit and valid scope of the invention.

What I claim as new and desire to secure by Letters Patent of the United States is:

1. A control system for a reaction power plant having a variable area discharge nozzle comprising a reciprocable actuating member for opening and closing the nozzle, a differential device connected to drive said actuating member, said differential device having two input connections, a nozzle adjusting actuator means connected to one of said input connections, and a quick release nozzle closing device connected to the other of said input connections.

2. A control system for a reaction power plant having a variable area discharge nozzle comprising a reciprocable actuating member for opening and closing the nozzle, a lever pivotally connected at an intermediate portion thereof to one end of said actuating member, a reciprocable nozzle adjusting actuator pivotally connected to one end of said lever, and a quick release nozzle closing device pivotally connected to the other end of said lever.

3. A control system for a reaction power plant having a variable area discharge nozzle comprising a reciprocable actuating member for opening and closing the nozzle, a lever pivotally connected at an intermediate portion thereof to one end of said actuating member, a reciprocable nozzle adjusting actuator pivotally connected to one end of said lever, a quick release nozzle closing device pivotally connected to the other end of said lever for moving said nozzle actuating member through movement of said lever in the nozzle closing direction, and a latch device engaging said quick release device for holding and releasing said quick release device as required.

4. A control system for a reaction power plant having a variable area discharge nozzle comprising a reciprocable actuating member for opening and closing the nozzle, a lever pivotally connected at an intermediate portion thereof to one end of said actuating member, a reciprocable nozzle adjusting actuator including an actuating motor pivotally connected to one end of said lever, a quick release nozzle closing device pivotally connected to the other end of said lever for moving said nozzle actuating member through movement of said lever in the nozzle closing direction, a latch device engaging said quick release device for holding and release thereof as required, and means responsive to an operating condition of said power plant for releasing said latch device.

5. A control system for a reaction power plant having a variable area discharge nozzle comprising a reciprocable actuating member for opening and closing the nozzle, a lever pivotally connected at an intermediate portion thereof to one end of said actuating member, a reciprocable nozzle adjusting actuator including an actuating motor pivotally connected to one end of said lever, a quick release nozzle closing device pivotally connected to the other end of said lever for moving said nozzle actuating member through movement of said lever in the nozzle closing direction, and a latch device engaging said quick release device for holding and release thereof as required, a pressure responsive device connected for detection of the engine tail pipe pressure, and a connection from said pressure responsive device to said latch device for actuation thereof to release said quick-release device upon the occurence of a drop in tail pipe pressure.

6. A control system for a reaction thermal power plant having a variable discharge nozzle area comprising a reciprocable actuating member for opening and closing the nozzle, a lever pivotally connected at an intermediate portion thereof to said operating member, a reciprocable nozzle actuator including an electric positioning motor pivotally connected to one end of said lever, energization circuits for said motor, a quick-release emergency nozzle closing device pivotally connected to the other end of said lever, a latch device arranged to hold and release said emergency closing device as required, and a switch' device positioned for actuation by movement of said emergency closing device from the held position and connected in one of said motor circuits to energize said motor for movement thereof in the nozzle closing direction to thereby reset said emergency closing device.

7. A control system for positioning the variable area discharge nozzle of a reaction thermal power plant comprising an actuating member for opening and closing the nozzle, a differential device connected to drive said actuating member, said differential device having two input connections, a nozzle actuator including an electric motor connected to one of said input connections for adjustably positioning said nozzle through movement of said differential device and said actuating member, a spring operated device connected to the other of said input connections and releasable to move the nozzle to the maximum closed position through movement of said differential device and said actuating member, a latch device for holding or releasing said spring operated device as required, an electric switch device normally engaged and held open by said spring operated device when in the unreleased position and biased to a closed position upon release thereof, an electrical circuit connecting said switch device to said actuating motor for operation thereof in the nozzle closing direction upon closure of said switch to thereby reset said spring operated device by motion transmitted from said actuator through said differential device.

8. A control system for positioning the variable area discharge nozzle of a reaction thermal power plant comprising an actuating member reciprocable between mechanical limit stops for opening and closing the nozzle, a lever pivotally connected at an intermediate portion thereof to one end of said actuating member, a reciprocable nozzle actuator including an electric motor pivotally connected to one end of said lever for opening and closing said nozzle through movement of said lever and said actuating member, a spring operated plunger device pivotally connected to the other end of said lever and releasable to actuate the nozzle to the maximum closed position through movement of said lever and said actuating member to the maximum closed mechanical limit stop, a latch device for holding or releasing said plunger device as required, an electric switch device normally engaged and held open by said plunger device when in the unreleased position and spring biased to a closed position upon release thereof, an electrical circuit connecting said switch device to said actuating motor for operation thereof in the nozzle closing direction upon closure of said switch to thereby reset said plunger device by motion transmitted from said actuator through said lever, said actuating member being held against said limit stop as a fulcrum for said lever.

9. A variable nozzle adjustment control system for a thermal power plant of the reaction type comprising a reciprocable actuating member for opening and closing the nozzle, a lever pivotally connected at an intermediate point thereof to said actuating member, a reciprocating actuating motor pivotally connected to one end of said lever for positioning said actuating member in accordance with desired nozzle openings, a quick release device connected to the other end of said lever and releasable for rapid movement of said actuating member to the maximum closed nozzle position, a solenoid operated latch device for holding and releasing said quick release device as required, a pressure responsive switch device for the detection of an engine pressure, and an energization circuit for said solenoid latch device including said pressure responsive switch device operable upon a decrease in the engine pressure for release of said latch.

10. A variable nozzle adjustment control system for a thermal power plant of the reaction type comprising a reciprocable actuating member for opening and closing the nozzle, a lever pivotally connected at an intermediate point thereof to said actuating member, a reciprocating actuating motor pivotally connected to one end of said lever for positioning said actuating member in accordance with desired nozzle openings, a temperature responsive device for measuring a temperature of said power plant, a temperature control amplifier connected to receive said temperature measurement, connections from said temperature control amplifier to said motor for reversible energization thereof to maintain desired engine temperatures by adjustment of the nozzle area, a quick release device connected to the other end of said lever and releasable for rapid movement of said actuating member to the maximum closed nozzle position, a solenoid operated latch device for holding and releasing said quick release device as required, a pressure responsive switch device for the detection of an engine pressure, and an energization circuit for said solenoid latch device including said pressure responsive switch device operable upon a decrease in the engine pressure for release of said latch.

11. A variable nozzle adjustment control system for a thermal power plant of the reaction type comprising a reciprocable actuating member for opening and closing the nozzle, a lever pivotally connected at an intermediate point thereof to said actuating member, a reciprocating actuating motor pivotally connected to one end of said lever for positioning said actuating member in accordance with desired nozzle openings, a temperature responsive device for measuring a temperature of said power plant, a temperature control amplifier connected to receive said temperature measurement, connections from said temperature control amplifier to said motor reversible energization thereof to maintain predetermined desired engine temperatures by adjustment of the nozzle area, a quick release device connected to the other end of said lever and releasable for rapid movement of said actuating member to the maximum closed nozzle position, a solenoid operated latch device for holding and releasing said quick release device as required, a pressure responsive switch device for the detection of an engine pressure, an energization circuit for said solenoid latch device including said pressure responsive switch device operable upon a decrease in the engine pressure for release of said latch, and a second switch connected to said quick release device for closure upon release thereof and a circuit connected for completion by said second switch to energize said actuator in the nozzle closing direction to re-latch said quick release device.

No references cited.